United States Patent [19]

Duginske

[11] Patent Number: 5,493,789
[45] Date of Patent: Feb. 27, 1996

[54] MITER GAUGE CALIBRATOR

[76] Inventor: Mark A. Duginske, 1010 First Ave., North, Wausau, Wis. 54401

[21] Appl. No.: 389,843

[22] Filed: Feb. 17, 1995

[51] Int. Cl.[6] .............................. B27B 27/10; B27G 23/00
[52] U.S. Cl. ................... 33/640; 33/202; 33/482; 83/421
[58] Field of Search ................. 33/640, 501.45, 33/533, 626, 628, 630, 633, 641, 645, 562, 563, 482, 534, 535, 201, 202; 83/421, 468.3, 522.15, 522.16, 522.17, 522.25

[56] References Cited

U.S. PATENT DOCUMENTS

| 4,002,329 | 1/1977 | Petrowski | 83/468.3 |
| 4,976,046 | 12/1990 | Lee et al. | 33/640 |

OTHER PUBLICATIONS

Applicant's exhibit 1, p. 92 from Garrett Wade Company Catalog describing Poly Gauge, admitted prior art. Date unknown.

Primary Examiner—Christopher W. Fulton
Attorney, Agent, or Firm—Quarles & Brady

[57] ABSTRACT

A miter gauge and saw blade calibrator is in the form of a flat plate with grooves defined in top and bottom surfaces at various angles. The grooves are sized to receive the bar of a miter gauge so that bar can be elevated above a table slot with its side extending above the slot abutting a side of the groove. The calibrator is slid along the bar toward the miter head until the miter head lays flat against one of the sides of the calibrator on both sides of the bar, to set the angle between the head and the bar equal to the angle between the groove and the corresponding side of the calibrator. Fine angle calibration bars can also be provided between the calibrator and the miter head so as to set smaller or unusual angle increments. In addition, the perimetral edges of the calibrator form different angles so that one edge can be placed against the table top surface of a table saw or other tool and another edge against the blade to accurately set the angle of the blade. Fine angle calibration bars can also be used for this purpose.

8 Claims, 5 Drawing Sheets

MITER GAUGE CALIBRATOR

BACKGROUND OF THE INVENTION

1. Field of the Invention

This invention relates to miter gauges of the type that are used on table saws, router tables and other types of shaping and cutting tools, and in particular to a calibration fixture for miter gauges of the type used for wood cutting, shaping and sanding.

2. Discussion of the Prior Art

Miter gauges of the type having a miter bar and a miter head pivotally fixed at one end of the bar are well known. The bar typically rides in a slot of a table, such as the table of a table saw, a router table, a band saw, a shaper, or a belt/disc sander, and is slidable therein, with the head abutting the workpiece to be cut so as to push the workpiece against the cutting tool.

The head is pivoted to the bar to rotate in a plane parallel to the table and the angle of the head relative to the miter bar can be fixed, for example with a thumb screw. Typically, an angular compass type angle scale is printed or embossed on the head so as to give a rough indication of the angle of the head relative to the bar.

In precision woodworking, the accuracy possible with the typical type of miter gauge is not adequate. For somewhat better accuracy, a combination square may be used, with its head against the bar and its blade against the width of the miter head face, but it is difficult to make the combination square lay flat against the bar in a horizontal plane to assure an accurate angle, and only a 90° or a 45° angle is typically available, and with questionable accuracy. An engineering triangle or other item defining a known included angle may be used, but typically these abut the head on only one side of the pivot point, which makes accurate positioning of the triangle or other item against both the head and bar so that both surfaces lay flat without any deviation difficult. It is also difficult to keep these positioned in a horizontal plane when setting the angle, as it is when using the combination square.

SUMMARY OF THE INVENTION

The invention provides a miter gauge calibrator comprising a flat plate having a front surface, a back surface and straight perimetral sides which overcomes the above disadvantages. At least one straight groove is formed in one of the surfaces which extends from one of the sides to another, said groove being of a width to receive a miter bar of a miter gauge and the groove extending at a certain angle relative to the sides. The miter bar is received in the groove with one of the sides of the calibrator abutting against the miter head working face to set the angle of the working face relative to the miter bar.

With a calibrator of the invention, the miter bar can be elevated slightly in the table slot, using shims, with the top portion of the miter bar received in a groove of the calibrator, against one side of the groove. The calibrator can then be slid along the bar toward the miter head, while being supported by the table top. When the calibrator first contacts the working face of the miter head, the head starts pivoting relative to the miter bar, and keeps on pivoting as the calibrator continues to be slid toward the head until the working face lays flat against one side of the calibrator. Thereby, the angle of the head relative to the bar is accurately set equal to the angle between the one side of the groove and the one side of the calibrator.

Preferably, multiple grooves are formed in the plate which are at different angles to an edge of the plate. The angles of the grooves to one side of the calibrator should include 22.5°, 45° and 90° to make the most common woodworking cuts. In another aspect, the perimetral sides are preferably at different angles relative to one another, so that the calibrator can be placed edge up on the table top of a table saw to set the angle of the blade.

In another aspect, a kit including a calibrator of the invention and fine angle calibration bars can be provided. The fine angle calibration bars have opposite sides that form small angles relative to one another, so that one or more of the bars can be placed between a calibrator and a miter head, or a saw blade, to set smaller angle increments. The bars preferably have a groove formed in a bottom surface for receiving a miter bar so the bars lay flat on the table when they are used to set the angle of a miter head.

DETAILED DESCRIPTION OF THE PREFERRED EMBODIMENTS

Figure 1:
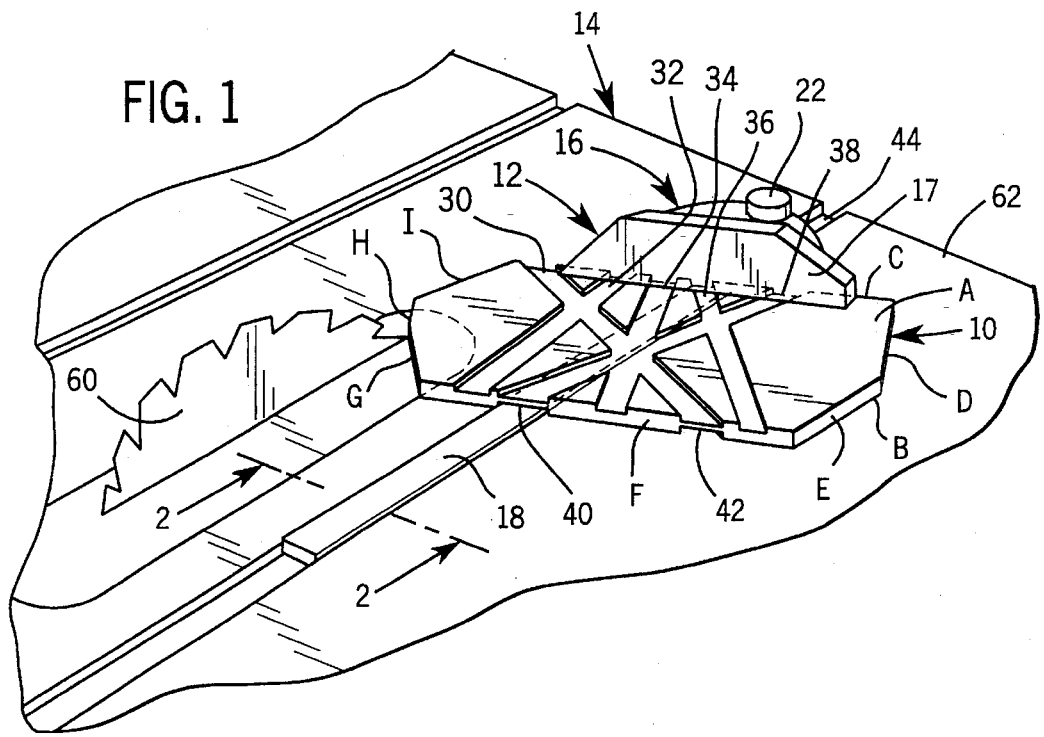
FIG. 1 is a perspective view of a calibrator of the invention, shown in position to adjust a miter gauge on the table of a table saw.

FIG. 1 illustrates a calibrator 10 of the invention positioned relative to a miter gauge 12 of a table saw 14 so as to set the angle of miter head 16 relative to miter bar 18. As is well known, head 16 is usually pivotable relative to bar 18 through an arc determined by groove 20 (FIG. 9) which is formed in the head 16 and which is centered on the pivot joint between the head 16 and bar 18. Thumbscrew 22 is threaded into the bar 18 so as to secure the angle or position of the head 16 relative to the bar 18. Rough angle indications are usually marked on the head 16 in the vicinity of the groove 20, but these are not accurate enough for fine woodworking.

Figure 2:
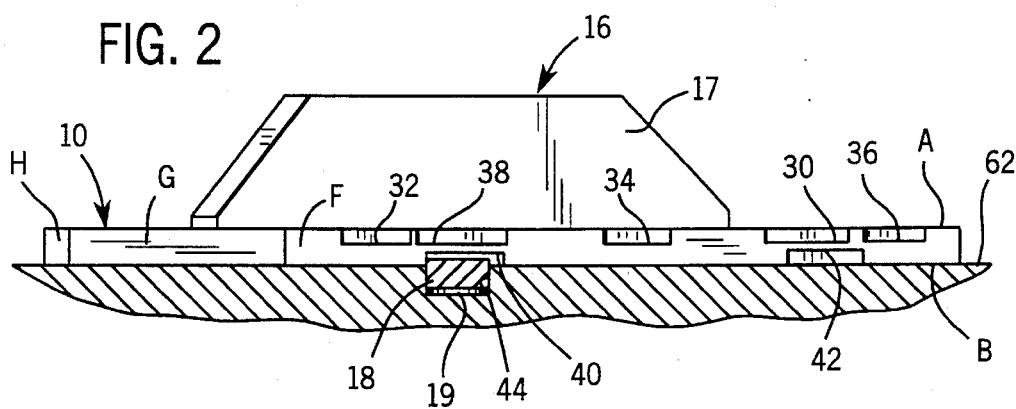
FIG. 2 is an sectional view from the plane of line 2—2 of FIG. 1 illustrating the calibrator, the miter bar, the table top surface and the miter gauge head.
Figure 3:
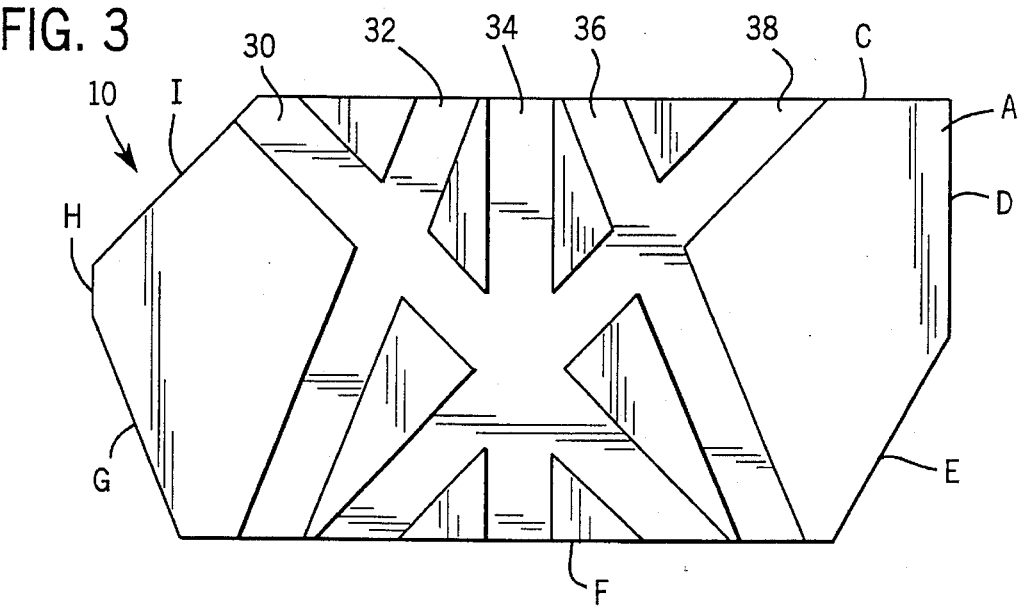
FIG. 3 is a top plan view of a calibrator of the invention.
Figure 4:
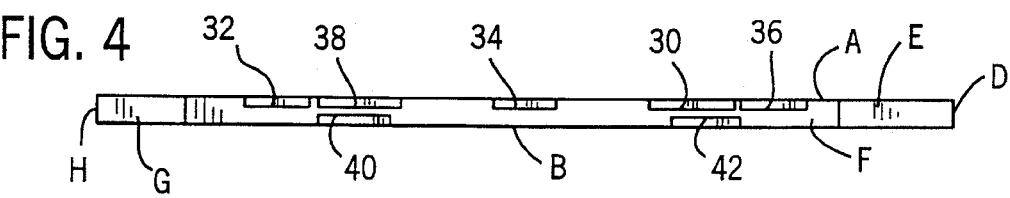
FIG. 4 is an end plan view of the calibrator of FIG. 3.
Figure 5:
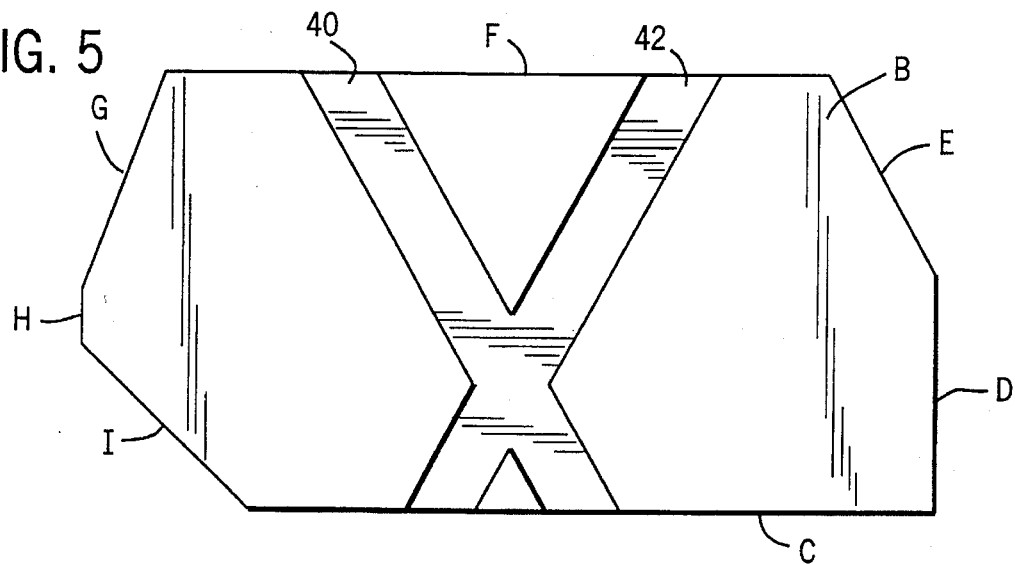
FIG. 5 is a bottom plan view of the calibrator of FIGS. 3 and 4.
Figure 6:
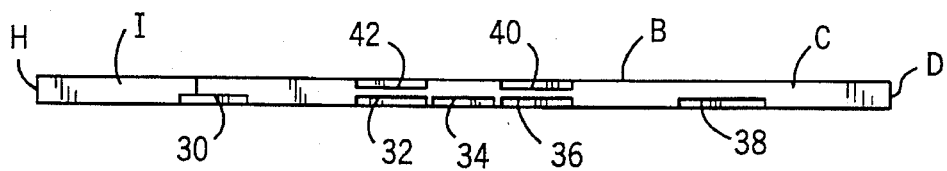
FIG. 6 is an end plan view of the calibrator of FIGS. 3–5 of the opposite end from the end shown in FIG. 4.

Accordingly, referring to FIGS. 1–6, the invention provides a calibrator 10 which is a flat sheet of material, preferably made of a transparent acrylic, having a top surface A, a bottom surface B and perimetral side surfaces C, D, E, F, G, H and I. The preferred embodiment shown is made from 11/32" thick transparent acrylic. Referring particularly to FIG. 3, grooves 30, 32, 34, 36 and 38 are formed in the top surface A,, with the grooves 32, 34, 36 and 38 extending between sides C and F, and the groove 30 extending between both sides C, I, and F, one end of groove 30 opening at the corner between sides C and I. Grooves 40 and 42 are formed in the bottom surface B, and extend between edges C and F.

Each of the grooves 32, 34, 36, 38, 40 and 42 is approximately 1/8" deep and 7/8" wide. The grooves are preferably cut in the calibrator 10 very accurately, for example with a CNC router, and in several passes so that each pass is a relatively shallow depth so as to minimize heating and consequent distortion. For example, grooves of the stated dimension can be cut in 5 or 6 passes, each pass being approximately 0.020 inches deep and with a tool which is equal in diameter to the width of the grooves. Acrylic plastic is preferred because it is dimensionally stable and can be machined to an accuracy of 0.001 inches for a 6 inch groove length (i.e., the angle is within 0.001 inches of perfection for a 6 inch groove).

This width is sufficient to receive in each groove all standard widths of miter bars. If a miter bar is less in width than the width of the groove, then the miter bar can be pressed up against just one side of the groove to accurately position the head 16 relative to the bar 18, as shown in FIG. 2, with the working face 17 of head 16 abutting either edge C or edge F. In this regard, it is preferred that the edge abutting the head working face 17 extend on both sides of the bar 18, so that it extends on both sides of the pivot point between the head 16 and the bar 18. Thereby, by simply exerting pressure against the head 16 and the side of the bar 18 with the calibrator 10, the head 16 pivots until the working face 17 is butted up flat against the side of the calibrator and the bar is abutted up flat against the side of one of the grooves, to accurately set the angular position of the head 16 relative to the bar 18. Since the calibrator 10 slides on the table during this process, the calibrator 10 is maintained flat in a horizontal plane to assure an accurate angle between the head 16 and bar 18.

As shown in FIG. 2, the miter guide 12 is preferably adjusted by elevating the bar 18 out of the slot 44, for example by using shims 19, such as two coins or washers. The thickness of the shims should be less than the depth of the grooves so that the calibrator lays flat against the table when the bar 18 is received in a groove. As stated, the top of the bar is received in a selected one of the grooves 30, 32, 34, 36, 38, 40 or 42, and one of the edges C or F (whichever is adjacent to the head 16) is butted up against the head 16. This sets the angle of the head 16 relative to the bar 18 equal to the angle between the respective groove and the edge C or F which is butted up against the head 16. The thumbscrew 22 is then tightened to secure the angle of the head 16 relative to the bar 18.

Accordingly, multiple grooves are provided in order to provide multiple angles of adjustment. Groove 34 is for setting a 90° angle between the head 16 and the bar 18, grooves 32 and 36 are for setting opposite 22.5° angles of the head 16 relative to the bar 18, and grooves 30 and 38 are for setting opposite 45° angles of the head 16 relative to the bar 18. Grooves 40 and 42 are for setting opposite 30° angles of the bar 18 relative to the head 16. As stated above, when setting the angle of the miter gauge, the calibrator 10 should be positioned so that its side abutting the head 16 extends on both sides of the bar 18. Thus, if the groove 30 were used for setting a 45°, edge F would be butted up against the head 16, rather than the edge C. Correspondingly, it is preferred to extend the edge as far as possible on both sides of the bar 18. Thus, when using the grooves 32 and 36, it is preferred to but edge C up against the head 16, rather than the edge F.

Figure 9:
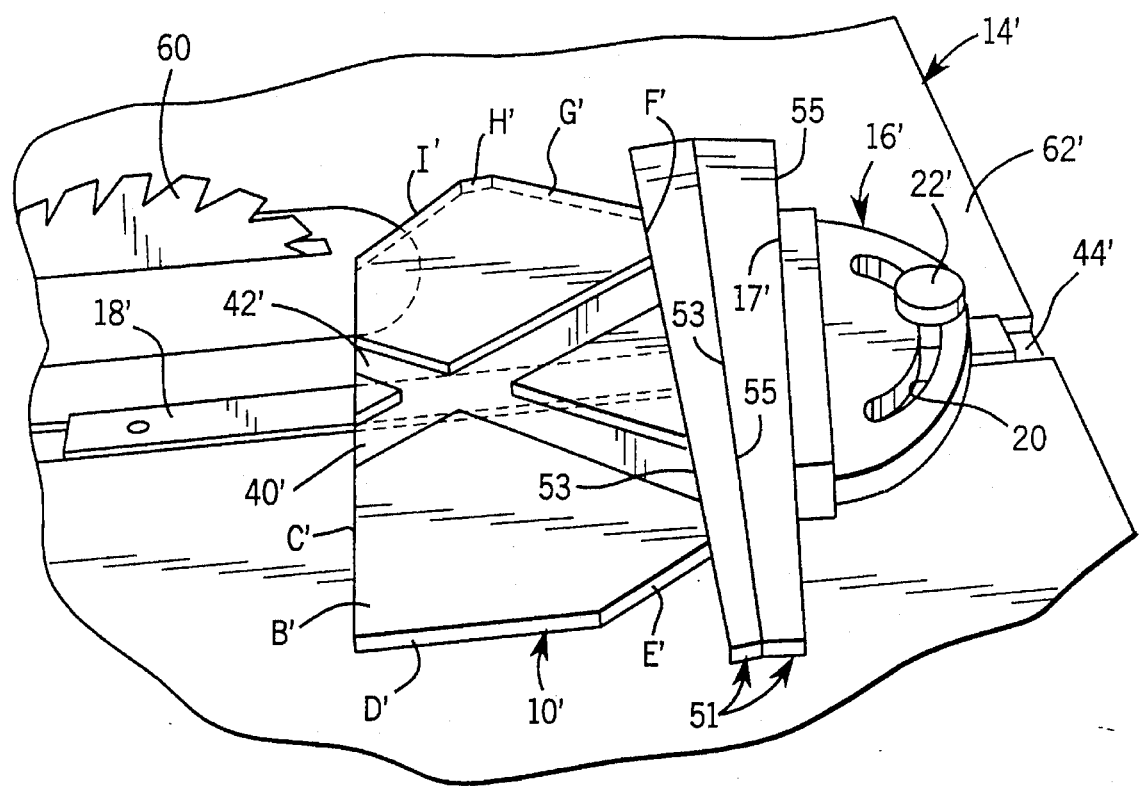
FIG. 9 is a perspective view of the calibrator of FIGS. 7 and 8 shown with fine angle calibration bars to set the angle of a miter gauge.
Figure 10:
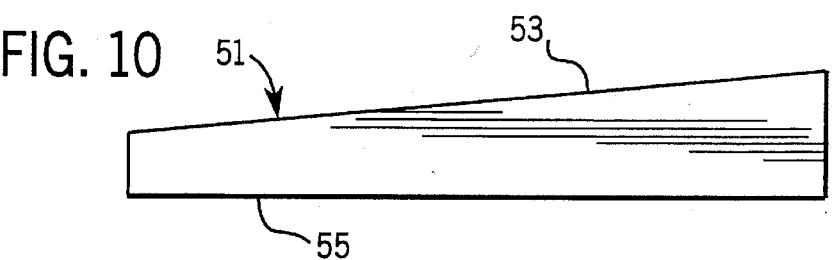
FIG. 10 is a top plan view of a fine angle calibration bar.
Figure 11:
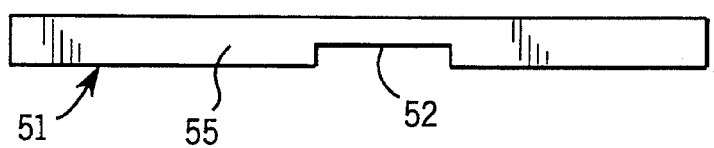
FIG. 11 is a side plan view of the bar of FIG. 10.

With the 22.5°, 45° and 90° angles, all of the common woodworking angles can be cut. However, there may be applications in which smaller degrees of adjustment are necessary. For this purpose, a series of fine angle calibration bars 51 of the type shown in FIGS. 9–11 can be provided. Each bar 51 could be made with a different angle, for example 1/2°, 1°, 2°, 3°, 4°, 5°, etc. In a kit, several 1/2° and 1° bars 51 may be provided, so that by using combinations of different size bars in conjunction with the calibrator 10, essentially any angle can be set. Calibration bars 51 would be used as shown in FIG. 9, pinching them between the miter head 16 and the calibrator 10, for adjusting the angle of the miter head 16 relative to the bar 18. Each bar preferably has a groove 52 in which the bar 18 is received so that the bar lays flat against the table. The side of the groove 52 is not pressed up flat against the bar 18, since the sides 53 and 55 of the bar 51 are used as the reference surfaces.

Figure 7:
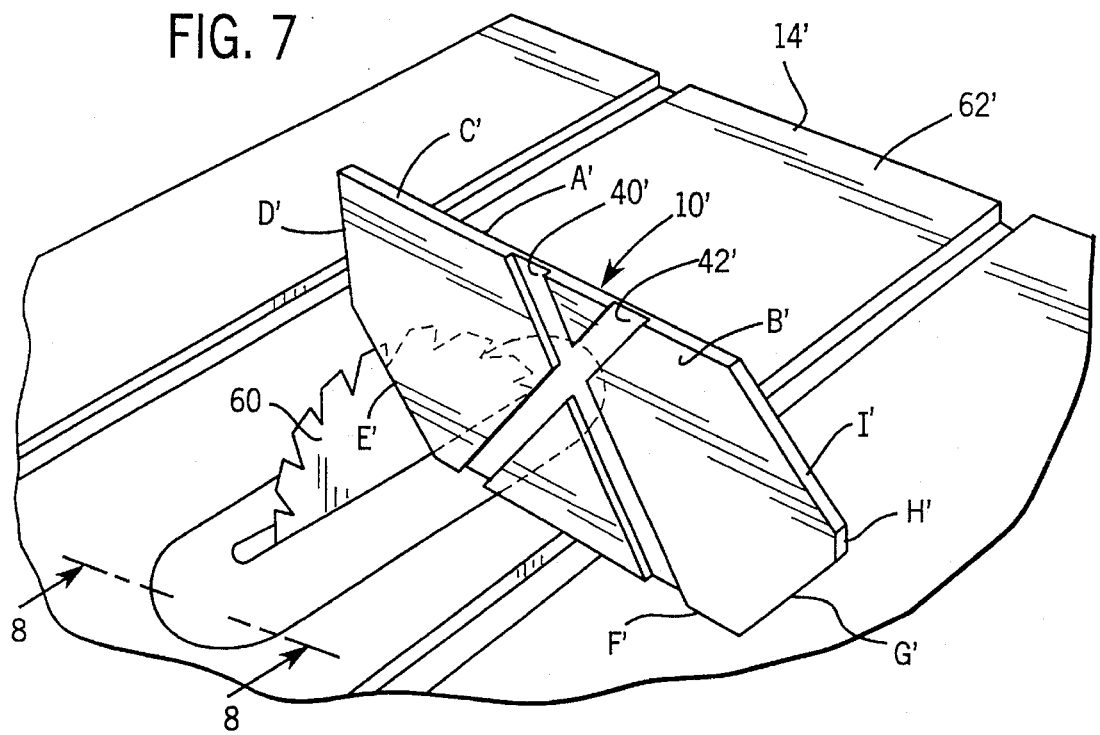
FIG. 7 is a perspective view showing a second embodiment of a calibrator of the invention on a table saw for setting the angle of the saw blade.
Figure 8:
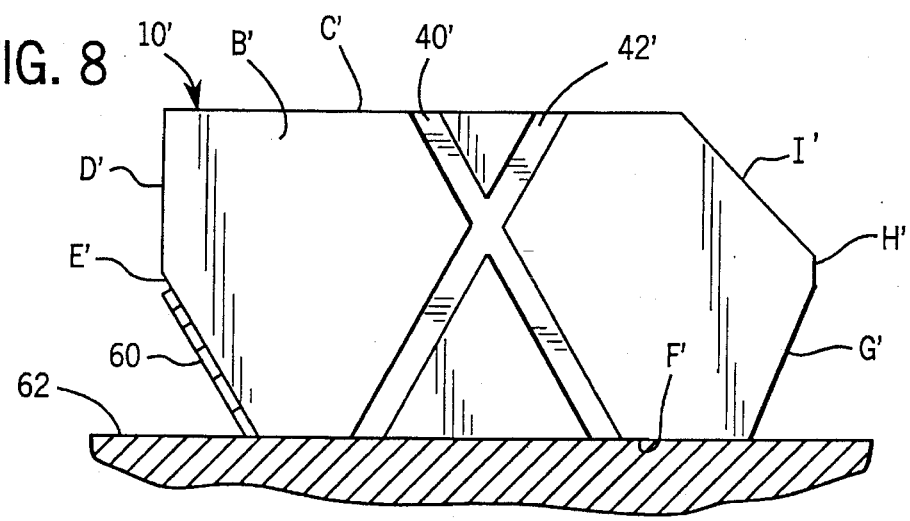
FIG. 8 is an end plan view from the plane of the line 8—8 of FIG. 7.

As shown in FIG. 7, 8, 12 and 13, the calibrator 10 can also be used to set the angle of the saw blade 60 relative to the table top 62 of the saw 14. For this purpose, one of the sides, preferably one of the longer sides such as size C or F, is placed against the table top 62 and another side, such as side E as shown in FIG. 7, is placed against the saw blade 60. The angle of the blade 60 is then adjusted until the side surface of the blade 60 lays in the same plane as the side E. Thereby, the angle between the blade 60 and the tabletop 62 is set equal to the angle between the side E and the side F. This is shown in FIG. 8.

Figure 12:
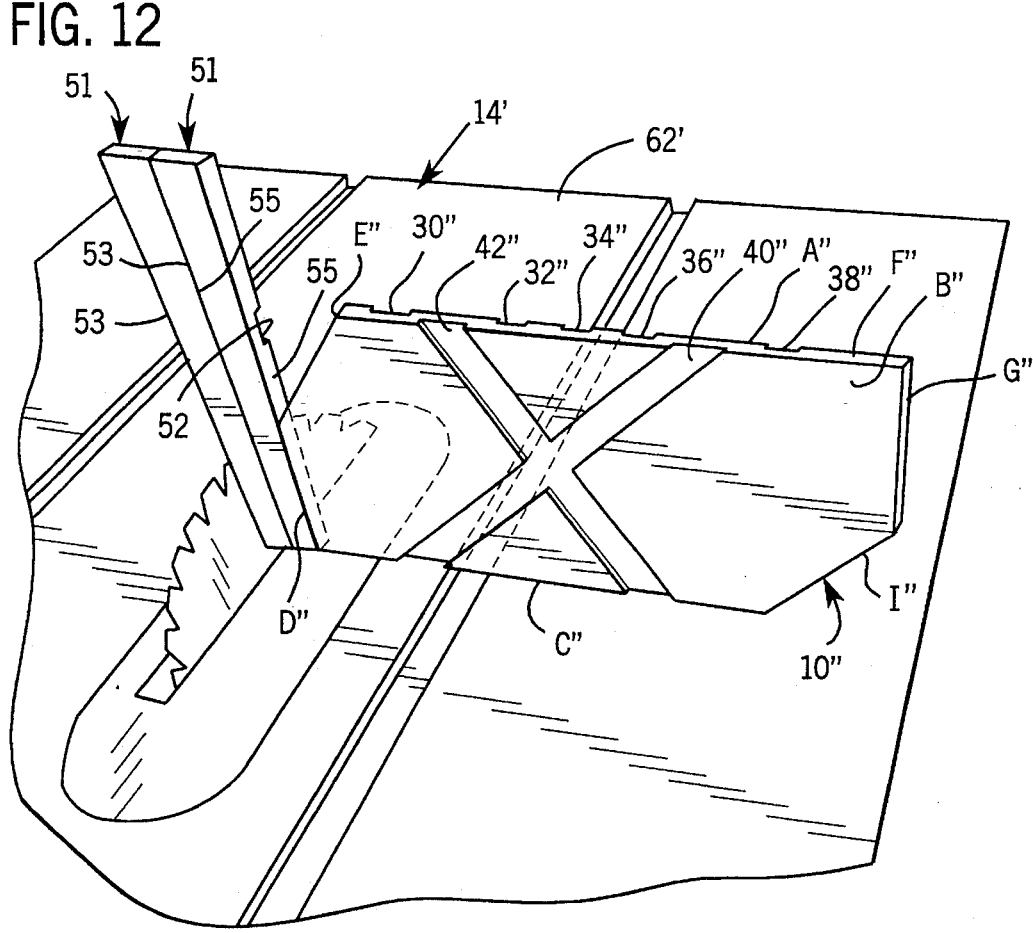
FIG. 12 is a perspective view showing a calibrator of the invention used in conjunction with fine angle calibration bars to set the angle of a table saw.
Figure 13:
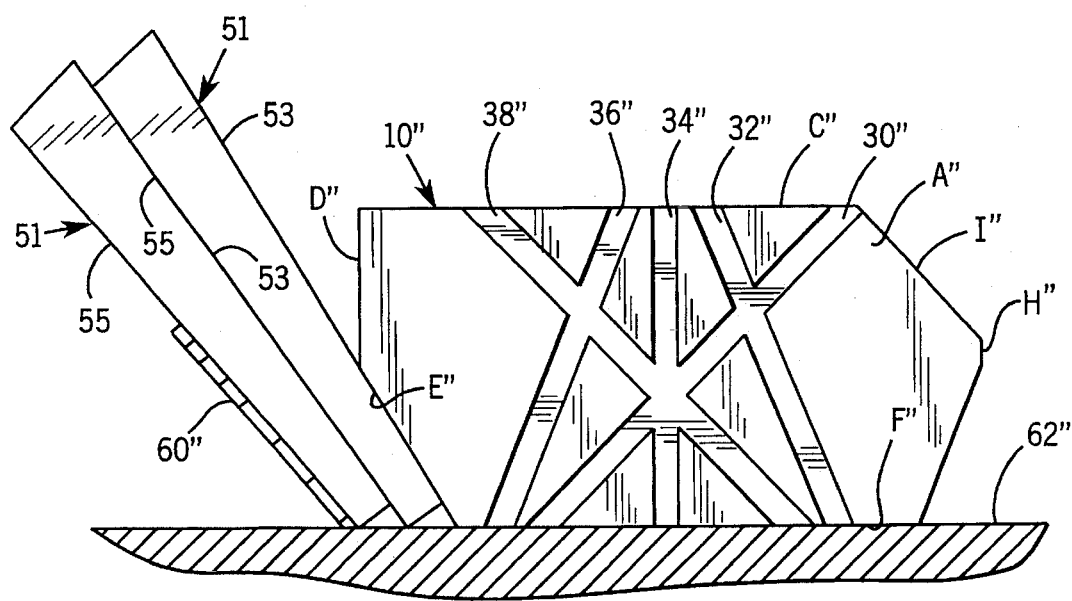
FIG. 13 is an end plan view similar to FIG. 8 showing a calibrator of the invention together with fine angle calibration bars for setting the angle of a table saw blade.

As shown in FIGS. 12 and 13, the blade angle adjustment illustrated in and described with respect to FIGS. 7 and 8 can also be performed in smaller increments of adjustment by using the fine angle calibration bars, as illustrated in FIGS. 12 and 13.

It is noted that FIGS. 7–9 show an embodiment 10' (corresponding elements are identified by the same reference numbers plus a prime (') sign) of the calibrator, which only has two grooves 40' and 42' on one side, and no grooves in the other side, and FIGS. 12 and 13 show other embodiments 10" in which the grooves are of other arrangements. It should be noted that any particular angles or combinations of angles may be used for the grooves in a calibrator of the invention.

Many modifications and variations to the preferred embodiments will be apparent to those skilled in the art. For example, other angles could be used for the grooves and sides than those which are illustrated. As a specific example, for making dovetail joints, a 10° angle could be provided between two sides of the calibrator for setting the blade angle to cut the dovetail sockets, and a 10° angle could be provided between a side and a groove (two grooves for oppositely directed angles) for setting the miter gauge angle to cut the dovetail pins. Therefore, the invention should not be limited to the embodiments described, but should be defined by the claims which follow.

I claim:

1. A miter gauge calibrator comprising a flat plate having a front surface, a back surface and straight perimetral sides, and at least one straight groove formed in one of said surfaces and extending from one of said sides to another, said groove being of a width to receive therein a miter bar of a miter gauge and said groove extending at a certain angle relative to said sides, so that said miter bar can be received in said groove with one of said sides abutting against a miter head to set an angle of said miter bar relative to said miter head.

2. A miter gauge calibrator as claimed in claim 1, wherein multiple grooves are formed in a surface of said plate, said grooves being at different angles to an edge of said plate.

3. A miter gauge calibrator as claimed in claim 2, wherein the angles of the grooves to at least one side of the calibrator include 22.5°, 45° and 90°.

4. A miter gauge calibrator as claimed in claim 1, wherein said perimetral sides are at different angles relative to one another.

5. A miter gauge calibrator as claimed in claim 4, wherein two of said perimetral sides form an angle of 45° and two of said perimetral sides form an angle of 90°.

6. A method of using a miter gauge calibrator to set the angle of a miter gauge head relative to a miter gauge bar, said method comprising the steps of;

providing a calibrator having a groove of a certain depth and width in a surface thereof which is at a certain angle relative to a side of said calibrator, said groove opening into said side and extending all the way across said surface;

receiving said miter gauge bar in a miter guide slot of a table with a top surface of said bar elevated above a top surface of said table by a distance which is less than said depth of said groove;

receiving said top surface of said miter gauge bar in said groove with a side of said bar which is extending out of said miter guide slot abutting a side of said groove and said side of said calibrator facing said miter gauge head;

sliding said calibrator along said bar so as to abut said side of said calibrator flat against said miter gauge head on both sides of said miter bar and thereby pivot said miter gauge head relative to said bar until said miter gauge head is pivoted to an angular position in which said head lays flat against said side of said calibrator;

securing said miter gauge head in said position relative to said miter gauge bar.

7. A method as claimed in claim 6, further comprising the step of interposing one or more fine angle calibration bars between said calibrator and said miter gauge head and abutting one of said bars against said miter gauge head so as to angularly position said miter gauge head.

8. A miter gauge calibrator kit comprising a flat plate having a front surface, a back surface and straight perimetral sides, and at least one straight groove formed in one of said surfaces and extending from one of said sides to another, said groove being of a width to receive therein a miter bar of a miter gauge and said groove extending at a certain angle relative to said sides, so that said miter bar can be received in said groove with one of said sides abutting against a miter head to set an angle of said miter bar relative to said miter head and one or more calibration bars, each said bar having a groove in one surface for receiving said miter bar and angled sides at opposite ends of said groove.

* * * * *